Dec. 8, 1959     C. E. MERCIER     2,916,590
METAL CLAD SWITCHGEAR
Filed June 18, 1958     2 Sheets-Sheet 1

Fig. 1

INVENTOR.
Carl E. Mercier
BY
Charles A. Grindell,
Attorney

Dec. 8, 1959
C. E. MERCIER
2,916,590
METAL CLAD SWITCHGEAR
Filed June 18, 1958
2 Sheets-Sheet 2
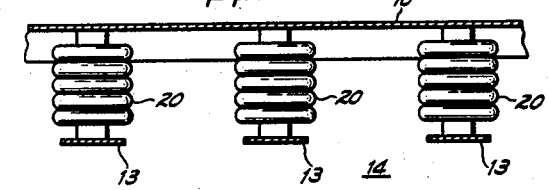
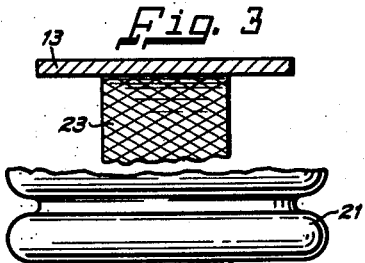
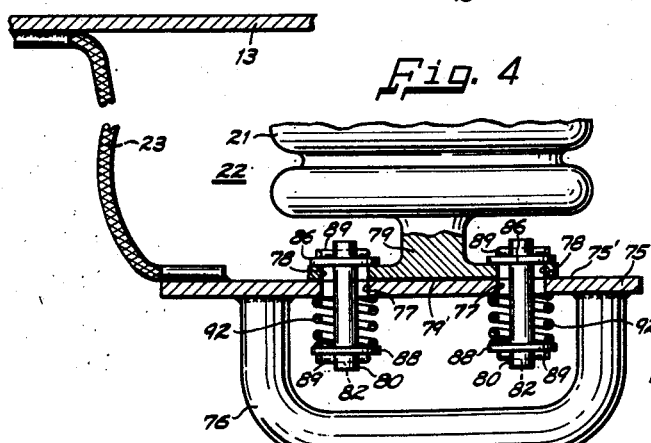
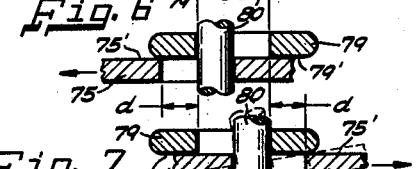
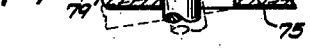
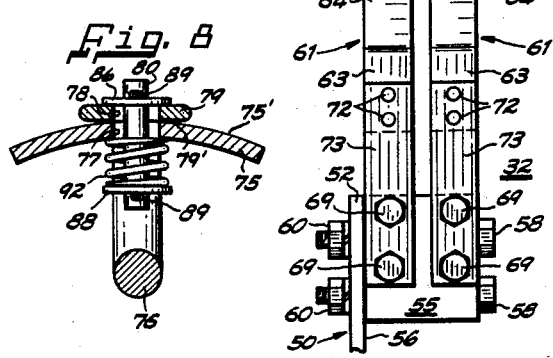
INVENTOR.
Carl E. Mercier
BY Charles A. Crandell,
Attorney United States Patent Office 2,916,590
Patented Dec. 8, 1959

2,916,590

METAL CLAD SWITCHGEAR

Carl E. Mercier, West Allis, Wis., assignor to McGraw-Edison Company, Milwaukee, Wis., a corporation of Delaware Application June 18, 1958, Serial No. 742,776

5 Claims. (Cl. 200—166)

This invention relates to metal clad switchgear and more particularly to metal clad switchgear of the type provided with disconnect contacts to permit withdrawal of the switchgear from the system.

In metal clad switchgear of the type allowing the switching device to be removed from the system, the conventional arrangement includes a stationary metal housing in which bus bars, cable leads and accessory apparatus are disposed and a movable unit comprising a circuit breaker which is connected by suitable contact means to the incoming buses and outgoing leads when in the operative position. The contact means generally includes contacts connected to the incoming buses and outgoing leads and fixedly mounted with respect to the stationary housing and coacting movable contacts carried by the movable circuit breaker. In vertical isolation units, the bus bars and cable leads are disposed in the upper part of the housing and their associated fixed contacts are automatically engaged by the movable contacts mounted on the upper ends of the circuit breaker terminals upon the raising of the circuit breaker to the operative position. Upon lowering of the circuit breaker to the servicing position, these contacts are disengaged and the circuit breaker is removed from the system. To facilitate the raising and lowering of the circuit breaker such units are generally provided with mechanical or hydraulic lift means. Such metal clad switchgear also include means which facilitate removal of the circuit breaker from the cubical after the lowering thereof to the servicing position.

In a three phase system such devices are provided with twelve contacts, three movable contacts mounted on the line terminals of the circuit breaker, three movable contacts mounted on the load terminals and six coacting stationary contacts fixedly mounted with respect to the housing. If there is misalignment between the circuit breaker and the housing, these contacts will not mate properly, resulting in binding upon movement of the circuit breaker into the operative position. Also, this incorrect seating of the contacts results in nonuniform contact pressure, causing uneven current distribution which in turn causes the contacts to become pitted and scarred. As a result, close tolerances were required in the assembly of the circuit breaker and its movable contacts and in the installation of the metallic housing and the fixed contacts, adding considerably in the cost of the device and requiring the use of costly aligning equipment. Uneven contact pressures in metal clad switchgear are also caused by the physical movement of the circuit breaker resulting from the energy released during the interruption of a fault current.

It is an object of the invention to provide new and improved electrical contact structure.

It is a further object of the invention to provide in a device of the character described self aligning electrical contacts.

It is another object of the invention to provide self aligning electrical contacts for metal clad switchgear of the drawout without use of special aligning.

Still another object of the invention is to provide contacts for metal clad switchgear of the drawout type wherein equal contact pressures are maintained during the interruption of fault currents.

These and further objects of the invention will be apparent from the detailed description of the present invention taken in view of the accompanying drawings in which:

Fig. 1 is a vertical view partly in section of a metal clad switchgear embodying self aligning contacts according to the present invention;

Fig. 2 is a fragmentary sectional view taken along line 2—2 of Fig. 1;

Figs. 3 and 4 are fragmentary elevational views partly in section of a preferred embodiment of the present invention;

Figs. 5, 6 and 7 are partial sectional views of the present invention illustrating the self aligning feature thereof; and Fig. 8 is a partial sectional view of a modification of the present invention.

The novel contact device according to the present invention includes a first contact means and a second contact means, one of said contact means being mounted for movement and the other being mounted in the path of said movement so that said contacts will engage upon movement of said one contact means in a first direction and disengage upon movement thereof in a second direction. The second contact means is also supported on its mounting for limited movement with respect to its mounting so that said first and second contact means may align upon engagement if necessary. The contact device according to the present invention may be utilized with polyphase metal clad switchgear wherein one of said contact devices is utilized to connect each of the line terminals of a circuit breaker to a bus bar and to connect each of the load terminals thereof to the terminals of a load cable. Movement of the second contact means relative to its mounting allows each of said second contact means to align themselves with the corresponding first contact means as the two contact means come into engagement. These realigning contacts according to the invention increase the allowable manufacturing and installation tolerances and allow movement of the circuit breaker during the interruption of fault currents without disturbing contact pressure balance.

Referring now to the drawing, Fig. 1 shows a metal clad switchgear unit which includes a cubical 10 formed of a suitable metal frame and sheet metal walls. A number of such feeder units 10, 11 and 12 are usually disposed in side by side abutment so that various distribution circuits can be supplied and controlled from a common substation. Power is supplied to each distribution circuit from a common supply bus 13 which extends through openings 14 on opposite sides of cubical 10. The power supply bus is connected to the bus of the distribution system 15 through a suitable circuit breaker 16 disposed in cubical 10. Suitable doors (not shown) are provided in cubical 10 so that access may be had to the interiorly disposed components when desired.

Cubical 10 is partitioned into an upper compartment 17 and lower compartments 18 and 19. Each of the three phase supply bus bars 13 are supported in the upper cubical 17 and are insulated from the metallic walls thereof by suitable insulating members 20. Mounted on insulators 21 vertically disposed beneath bus bars 13 are incoming stationary line contact means 22 which are electrically connected to bus bars 13 by suitable flexible conducting straps 23. In horizontal space relation to the incoming stationary line contact means 22 are the outgoing stationary load contact means 24 which are electrically connected to the distribution system bus 15 by suitable flexible conducting straps 25.

A suitable three phase circuit breaker 16 is disposed in lower cubical 18 and has three line terminals 26 (only one of which can be seen in Fig. 1) which extend through openings 28 in upper wall 30 of cubical 18 when said circuit breaker is in the operative position as shown in full in Fig. 1. Each line terminal 26 is provided with a contact means 32 which engages the stationary line contact means 22 when the recloser is in its operative position. Similarly, circuit breaker 16 is provided with three load terminals 34 each of which extends through openings 36 in wall 30 and each is provided with contact means 38 which engage the outgoing stationary load contact means 24 when recloser 16 is in its operative position.

Suitable hydraulic means 40 is provided for raising and lowering the circuit breaker 16 between the operative position shown in Fig. 1 and the service position shown dotted in Fig. 1. This allows the circuit breaker to be raised so as to cause engagement with the stationary contacts 22 and 24 and to be lowered for removal from the system when the occasion for maintenance arises. Hydraulic device 40 is provided with wheels 41 which cooperate with suitable rails 42 disposed on the floor of compartment 18 and which allows the circuit breaker to be removed from cubical 10 if desired.

The distribution system or load bus bars 15 are supported in cubical 17 and insulated from the metallic walls thereof by suitable insulators 43 and 44 and each feeds vertically into lower compartment 19 where they enter a cable terminator 46 out of whose bottom extends an underground load cable 48.

The self aligning contacts associated with the line terminal 26 and load terminal 34 according to the present invention are identical and hence only one of those associated with the line terminals 26 will be discussed in detail for the sake of brevity. These contacts are shown in greater detail in Figs. 3 and 4 and include movable contact means 32 mounted on one of the circuit breaker terminals 26 and stationary contact means 22 mounted on one of bus bars 13 and in the path of movement of said movable contact means. It will be understood, however, that the disposition of contact means 22 and 32 is merely intended as an example and that contact means 22 could, if desired, be mounted on the circuit breaker terminals 26 and contact means 32 mounted on bus bar 13 without deviating from the spirit of the present invention.

Movable contact means 32 includes a substantially L-shaped conductive member 50 having a lower leg portion 51 disposed against the top of terminal 26 and an upstanding leg portion 52 extending toward stationary contact means 22. Lower leg portion 51 has an opening 51′ for receiving a conductive stud 53 electrically connected to the line side of one of the phases of circuit breaker 16. The L-shaped conductive member 50 is secured to conductive stud 53 and held in electrical contact therewith by nut 54 threaded on conductive stud 53. A short rectangular mounting bracket 55 is secured to the inner face 56 of upstanding leg 52 of L-shaped member 50 by any suitable means such as through bolts 58 and nuts 60 threaded on the ends of said through bolts.

Two pair of contact fingers 61 comprising first and second contact members are mounted in opposed relation on each of the lateral portions of the rectangular mounting bracket 55 by current carrying members 62. Contact fingers 61 each comprise an elongate conducting member having a lower portion 63 and an upper portion 64 of substantially equal length and canted at a small angle with respect to the lower end portion 63. Each pair of opposed contact fingers 61 are mounted so that the inner surface 64′ of the upper portions 64 are divergent and inclined with respect to the horizontal. The upper end of contact fingers 61 may also be rounded to facilitate engagement with the fixed contact means 22.

Current carrying members 62 each comprise a stack of preformed laminations having a pair of end portions 65 and 66 connected by a V-shaped central portion 67. Through bolts 69 and nuts 71 secure two of said current carrying members 62 to each of the lateral sides of mounting bracket 55 so that pairs of said members are disposed in opposed relation. As clearly indicated in Fig. 3 the through bolts 69 are offset relative to the through bolts 58 to prevent interference therebetween.

Lower portions 63 of each of the contact fingers 61 are secured to the inner side of end portions 66 of its associated current carrying member 62 by any suitable means such as rivets 72 so that said lower portions 63 are disposed in substantially parallel spaced apart relation when the contact means 22 and 32 are out of engagement. To maintain suitable contact pressure between contact fingers 61 and the portion of contact means 22 engaged thereby, a flat leaf spring 73 is disposed between each of the current carrying members 62 and the securing devices 69 and 72.

Stationary contact means 22 is supported beneath bus bar 13 by any suitable means such as insulating member 21 and includes a rectangular conducting plate 75 and a U-shaped third contact member 76. The U-shaped contact member 76 preferably has a circular cross section and is secured to the underside of the conducting plate 75 in any suitable manner such as brazing. The diameter of contact member 76 is greater than the normal distance between the lower portions 63 of contact fingers 61 when the contact means 22 and 32 are out of engagement. As a result, when said contact means are in the operative position as shown in Fig. 3, contact fingers 61 are held in firm engagement with contact member 76 by spring members 73.

As seen in Fig. 4 conducting plate 75 is provided with a pair of spaced apart openings 77 extending therethrough and which are in alignment with corresponding openings 78 in a base member 79 secured to lower end of bushing or insulating member 21. A pin 80 extends through each of the pairs of aligned openings and each of said pins is provided with a small aperture 82 in each of the opposite ends thereof. Pins 80 are retained in openings 77 and 78 by means of washers 86 and 88 secured on opposite ends of pins 80 by cotter pins 89 disposed in apertures 82. A compression spring 92 surrounds each of the pins 80 and is disposed between washers 88 and on the lower end of pins 80 and the underside of conducting plate 75 to resiliently hold the upper surface 75′ of conducting plate 75 in slidable engagement with surface 79′ on the underside of base member 79.

The diameters of holes 77 and 78 are preferably substantially equal and each is preferably a predetermined greater size than the diameter of pin 80. This allows conducting plate 75 to move a limited distance in any horizontal direction with respect to base member 79 when a horizontal force is exerted on contact member 76 which exceeds the frictional force between surfaces 75′ and 79′ resulting from the contact pressure therebetween imparted by springs 92. This can best be seen in Figs. 5–7 which show that when holes 77 and 78 are disposed coaxially, conducting member 75 can move a distance $d$ in any direction with respect to member 79, where $d$ is the difference between the diameter $d_p$ of the pin 80 and the diameters $d_h$ of holes 77 and 78.

Flexible conducting members 23 allow movement of conductive member 75 with respect to bus bar 13 while maintaining good electrical contact therebetween and is secured to bus bar 13 and conductive plate 75 by any suitable means such as brazing.

The current path between bus bar 13 and stud 53 on terminal 26 is through flexible conducting member 23, conductive member 75, contact member 76, contact 61, spring members 62, mounting bracket 55 and L-shaped member 50 and nut 54, all of said members being of a good electrical conducting material.

In operation, as the circuit breaker 16 is advanced toward bus bars 13 and 15, contact member 76 will engage one of the opposed contact surfaces 64' if there is misalignment between contact fingers 61 and contact member 76. Upon further movement of circuit breaker 16 toward bus bar 13, the engaged contact surface 64' will impart a horizontal force to contact member 76 which is transmitted to conductive member 75 urging said conductive member to move in a horizontal direction with respect to base member 79. If, for example, this horizontal force urges conductive member 75 toward the right as viewed in Fig. 7, said member will slide in this direction until the inner surface of opening 77 engages pin 80 whereupon pin 80 will be carried toward the right until the opposite side thereof engages the inner surface of opening 78. If conductive plate 75 were not free to move in this manner, unequal contact pressure between contact member 76 and contact fingers 61 would result, causing unequal current flow therebetween, which would in turn result in scarring of the contacts. In a similar manner, alignment and hence equal contact pressure will be maintained upon horizontal movement of circuit breaker 16 during the interruption of fault currents. In order to also maintain the desired contact pressure upon downward movement of circuit breaker 16 under such conditions, the biasing forces of springs 73 and 92 are chosen so that the frictional force between contact fingers 61 and contact member 76 exceeds the biasing force of springs 92. As a result, upon downward movement of circuit breaker 16 contact member 76 will also move an equal distance so that there is no relative movement between contact fingers 61 and contact member 76 whereby the contact pressure therebetween does not diminish.

If the misalignment between contact fingers 61 and contact member 76 is greater than $d$, the horizontal force on member 76 will tend to pivot conductive plate 75 and contact member 76 around the edge of base member 79. In order to facilitate such pivotal movement, the width of base member 79 is made as narrow as practicable. To further enhance such pivotal movement, conductive member 75 or base member 79 may be rounded as shown in Fig. 8.

It can thus be appreciated from Figs. 5-7 that is there is misalignment between the circuit breaker and the housing or between the individual fixed and movable contacts, the slidable and rocking engagement of conductive member 76 and base member 79 allows relative movement therebetween in a direction tending to bring contact member 76 into alignment with contact fingers 61 facilitating ready engagement between the corresponding contacts and maintaining uniform contact pressure.

While only a preferred embodiment of the invention has been illustrated and described, many modifications and variations thereof will be obvious to those skilled in the art, and consequently it is intended to cover in the appended claims all such variations and modifications which fall within the true spirit and scope of the invention.

I claim:

1. A contact device comprising first and second contact means, said second contact means including a base member having a surface and a plate-like contact member, and means for resiliently holding said plate-like member to said surface for limited sliding and rocking movement relative thereto, one of said contact means being mounted for movement in a direction substantially perpendicular to said surface, the other of said first and second contact members being disposed in the path of such movement so that said first and second contact means will engage upon movement of the one contact means in said direction and disengage upon movement in an opposite direction.

2. A contact structure comprising a first contact means; a second contact means having a base member, a contact member and coupling means; said coupling means including a coupling element engaging one of said members, and biasing means disposed between the other of said members and said coupling element; said coupling element having a portion adjacent the juncture of said members and spaced from said other member so that said contact member is slidable and rockable relative to said base member until said other member engages said coupling element.

3. A contact device comprising fixed and movable contact means, one of said contact means having a base member and a contact member, said members being in contact along at least one line of tangency, said contact member having an aperture formed therein and disposed adjacent said base member, a coupling element having a cross-sectional area which is smaller than the area of said aperture and extending therethrough, said coupling element having a first end portion engaging one of said members and a second end portion, spring means disposed between said second end portion and the other of said members so that said contact member is resiliently slidable relative to said base member until an inner edge of said aperture engages one of the sides of said coupling element.

4. A contact device comprising fixed and movable contact means, one of said contact means having a base member and a conductive member, said conductive member and said base member each having an aperture formed therein and disposed adjacent that of the other, pin means extending through said apertures and having a diameter less than the diameter of either of said apertures, said pin means having an end portion engaging one of said members, spring means disposed between the other end of said pin means and the other of said members so that said contact member is resiliently slidable and rockable relative to said base member until said pin means is engaged by each of said apertures.

5. A contact device comprising fixed and movable contact means, one of said contact means including a base member having a surface and a plate-like conductive member, and coupling means for resiliently holding said plate-like member to said surface, said contact member and said conductive member each having an aperture formed therein and being in substantial registry when said surfaces are in engagement, said engaging means including spring means and pin means extending through said apertures and having a diameter smaller than the diameter of at least one of said apertures, one end of said pin means engaging one of said members, said spring means being disposed between the other end of said pin means and the other of said members so that said plate-like member is resiliently held in rockable and sliding engagement with said base member.

References Cited in the file of this patent

UNITED STATES PATENTS

| | | |
|---|---|---|
| 1,997,082 | Reynolds | Apr. 9, 1935 |
| 2,109,211 | Dyer | Feb. 22, 1938 |